United States Patent Office 3,285,845
Patented Nov. 15, 1966

3,285,845
HYDROGENATION OF WAXES
Jacques Demeester, Courbevoie, Seine, France, assignor to The British Petroleum Company Limited, London, England, a British joint-stock corporation
No Drawing. Filed Feb. 5, 1964, Ser. No. 342,801
Claims priority, application France, Feb. 12, 1963, 924,549
10 Claims. (Cl. 208—27)

The present invention relates to the hydrogenation of waxes and in particular waxes obtained from petroleum.

The term wax is used here to describe both waxes obtained from petroleum distillates and those obtained from residues. Such waxes are traditionally treated with sulphuric acid and clay, the acid treatment being intended to remove from the wax unstable components which are responsible for its bad odour and its poor colour stability and the clay treatment being intended to neutralise and decolorise the wax.

The object of the present invention is to replace these two treatments by a controlled hydrogenation process, thus increasing the yield of refined product and doing away with the necessity of disposing of large quantities of used acid and clay.

According to the present invention, a hydrogenation process consists in bringing the wax into contact at elevated pressure and temperature and in admixture with hydrogen with a catalyst comprising rhenium oxide ($ReO_7$), on a support.

Preferably 1 to 25% by weight of rhenium oxide is used, based on the weight of total catalyst. Catalysts which are particularly suitable contain from 3 to 10% by weight of rhenium oxide.

If desired the catalyst may also contain one or more iron group metal oxides, particularly nickel oxide. The amount of such oxides may be in the range 1 to 10% wt., particularly 2 to 5% wt.

Catalysts of rhenium oxide on a support may be prepared in known manner, particularly by impregnation of the support with a solution of a suitable rhenium salt followed by drying and calcination, preferably at 500 to 600° C. Iron group metal oxides may also be added by impregnation.

The support is preferably a refractory oxide selected from Groups II to V of the Periodic Table, particularly one which has a low activity in itself under the hydrogenation conditions used. The preferred support is alumina. The alumina is preferably calcined before the addition of the oxide or oxides at a temperature of from 500 to 900° C., particularly from 700 to 900° C.

The hydrogenation temperature may be in the range 250 to 340° C. and the pressure of hydrogen at least 35 kg./cm.$^2$.

The pressure of hydrogen is preferably at least 40 kg./cm.$^2$. A convenient upper limit is 100 kg./cm.$^2$, more particularly 70 kg./cm.$^2$. The space velocity of the wax may be from 0.1 to 5 v./v./hr.

It has been found that it is possible to use low hydrogen treating rates of not more than 80 volumes of hydrogen by volume of wax (equivalent to not more than 450 s.c.f. of hydrogen/barrel of wax) and such rates are preferred. Hydrogen rates of from 10 to 50 vols./vol. have been found to be suitable in practice. The hydrogen may be used on a once through basis or with recycle.

It is not essential to use pure hydrogen, but if gases rich in hydrogen are used such as catalytic reforming gases, the flow rate and total pressure should be adjusted to ensure that the pressure of hydrogen is at least 35 kg./cm.$^2$.

It is found that the conditions of treatment necessary to produce a satisfactory product may vary according to the type of wax which is being treated. Thus for waxes obtained from distillates which have been solvent-treated, the conditions are generally less severe than for the waxes obtained from distillates which have not been solvent-treated or for waxes obtained from residues which are generally microcrystalline. Increased severity can be achieved by one or more of the following factors: increase in temperature, increase in hydrogen flow rate and decrease in space velocity.

Typical conditions of treatment for these two classes of waxes are shown in Table No. 1 below:

TABLE 1

| Origin of Wax | Hydrogen pressure, kg./cm.$^2$ | Reaction temperature, ° C. | Rate of flow of feedstock | Rate of flow of hydrogen |
|---|---|---|---|---|
| Distillate treated with solvent | 40 | 250–300 | 1 vol./vol. of cat./hr. | 20 vol./vol. of charge. |
| Distillate not treated with solvent or residue waxes. | 40 | 300–340 | 0.5–0.75 vol./vol. cat./hr. | 40 vol./vol. of charge. |

In the operation of the present invention, the wax in liquid form, is preferably treated, prior to hydrogenation, to deaerate it and remove traces of entrained solvent which could bring about a subsequent deterioration in the wax. A suitable form of pretreatment is, for example, steam stripping, preferably at temperatures in the range 80 to 100° C. The wax is then mixed with necessary quantity of hydrogen, the mixture is heated to the desired reaction temperature and then passed over the catalyst at the desired rate of flow and pressure.

Gas is first of all separated from the product at the reaction pressure and the remainder of the gas is then separated in a second low-pressure separator. Finally the wax is rectified in steam and subsequently dried in vacuo.

The invention is illustrated by the following examples.

*Example 1*

The paraffin wax feedstock used had a melting point of 50° C. and came from a non-solvent treated distillate of Kuwait origin.

The process conditions used were

| | |
|---|---|
| Temperature, ° C. | 335 |
| Pressure of hydrogen, kg./cm.$^2$ | 40 |
| Space velocity, v./v./hr. | 0.5 |
| Hydrogen addition rate, vol./vol. | 40 |

The catalyst used consisted of 6% wt. of rhenium oxide on an alumina which had been pre-calcined at 800° C.

The results obtained are shown in Table 2 below:

TABLE 2

| | Raw material | Wax treated with rhenium catalyst | Wax treated with acid and clay |
|---|---|---|---|
| Saybolt colour before ageing | (¹) | +25 | +25 |
| Saybolt colour after ageing for 1 hr. at 200° C | | +23 | +24 |
| Odour | 2–3 | 9 | 9 |

¹ Cloudy.

*Example 2*

The paraffin wax feedstock of Example 1 was treated with a catalyst of 6% wt. rhenium oxide and 3% wt.

nickel oxide on an alumina which had been pre-calcined at 800° C.

The process conditions and results obtained are shown in Table 3 below:

TABLE 3

| Treating conditions: | | | | | |
|---|---|---|---|---|---|
| Temperature, °C | 260 | 280 | 300 | 320 | 340 |
| Pressure of hydrogen, kg./cm.² | 40 | 40 | 40 | 40 | 40 |
| Space velocity, v./v./hr | 0.5 | 0.5 | 0.5 | 0.5 | 0.5 |
| Hydrogen addition rate, vol./vol. | 40 | 40 | 40 | 40 | 40 |
| Results obtained: | | | | | |
| Saybolt colour before ageing | +25 | +25 | +25 | +25 | +25 |
| Saybolt colour after ageing for 1 hr. at 200° C | +20 | +21 | +21 | +21 | +22 |
| Odour | 9 | 10 | 9 | 9 | 9 |

I claim:

1. A process for improving the odour and colour of wax comprising contacting the wax at elevated temperature and pressure, the temperature being from about 250 to 340° C., and in admixture with hydrogen, the pressure of hydrogen being at least 35 kg./cm.², with a catalyst comprising from 1 to 25% by weight of rhenium oxide on a support.

2. A process as claimed in claim 1 wherein the amount of admixed hydrogen is not more than 80 volumes/volume of wax.

3. A process as claimed in claim 2 wherein the amount of admixed hydrogen is from 10 to 50 vols./vol.

4. A process as claimed in claim 1 wherein the hydrogen pressure is from 40 to 100 kg./cm.².

5. A process as claimed in claim 1 wherein the wax is derived from a solvent-treated distillate and the hydrogenation temperature is from 250 to 300° C.

6. A process as claimed in claim 1 wherein the wax is derived from a petroleum fraction selected from the class consisting of non-solvent-treated distillates and residues and the hydrogenation temperature is from 300 to 340° C.

7. A process as claimed in claim 1 wherein the catalyst contains from 3 to 10% wt. of rhenium oxide.

8. A process as claimed in claim 1 wherein the catalyst also contains from 1 to 10% wt. of an iron group metal oxide.

9. A process as claimed in claim 8 wherein the iron group metal oxide is nickel oxide.

10. A process as claimed in claim 1 wherein the support is alumina.

References Cited by the Examiner
UNITED STATES PATENTS

| 2,846,356 | 8/1958 | Mills et al. | 208—27 |
| 2,915,448 | 12/1959 | Annable et al. | 208—27 |
| 3,119,762 | 1/1964 | Siegmund | 208—27 |
| 3,166,489 | 1/1965 | Mason et al. | 208—27 |
| 3,206,387 | 9/1965 | Smilski | 208—20 |

DANIEL E. WYMAN, *Primary Examiner.*

P. E. KONOPKA, *Assistant Examiner.*

UNITED STATES PATENT OFFICE
CERTIFICATE OF CORRECTION

Patent No. 3,285,845                      November 15, 1966

Jacques Demeester

It is hereby certified that error appears in the above numbered patent requiring correction and that the said Letters Patent should read as corrected below.

Column 1, line 36, for "$(ReO_7)$" read -- $(Re_2O_7)$ --.

Signed and sealed this 12th day of September 1967.

(SEAL)
Attest:

ERNEST W. SWIDER                      EDWARD J. BRENNER
Attesting Officer                       Commissioner of Patents